United States Patent [19]

Wcislo et al.

[11] Patent Number: 5,097,591
[45] Date of Patent: Mar. 24, 1992

[54] DEVICE FOR REMOVING THE WINDING OF A LINEAR MOTOR

[75] Inventors: Manfred Wcislo, Ottobrunn; Otto Breitenbach, Nuremberg, both of Fed. Rep. of Germany

[73] Assignee: Kabelmetal Electro Gesellschaft mit beschränkter Haftung, Hanover, Fed. Rep. of Germany

[21] Appl. No.: 732,825

[22] Filed: Jul. 19, 1991

[30] Foreign Application Priority Data

Sep. 25, 1990 [DE] Fed. Rep. of Germany ....... 4030236

[51] Int. Cl.⁵ .............................................. H02K 15/00
[52] U.S. Cl. ....................................... 29/762; 29/596; 29/736; 29/281.6; 29/824
[58] Field of Search ............... 29/596, 598, 762, 732, 29/736, 281.6, 824; 310/42, 12, 13, 27

[56] References Cited

U.S. PATENT DOCUMENTS 4,557,038 12/1985 Wcislo et al. ..................... 29/596

FOREIGN PATENT DOCUMENTS 2920478 12/1980 Fed. Rep. of Germany .

Primary Examiner—Carl E. Hall
Attorney, Agent, or Firm—Martin A. Farber

[57] ABSTRACT

A device for removing a winding of an electric linear motor which winding is arranged in downwardly open grooves of a bundle of laminations fastened to a support. The individual strands of the winding are held fast in the grooves on holders. The holders have feet with webs which extend out of the grooves, the feet engaging in mounted position in undercuts in the grooves. The device includes at least one removal device arranged on a vehicle which is moveable on the support, the device having at least one pressing tool and at least one pulling tool coupled with it. The pressing tool has two bevels extending in V-shape to each other which are intended to come against the webs of the feet, by which bevels, upon the downward movement of the removal device, every two webs present on opposite sides of the holder are pressed towards each other. The pulling tool includes of two hooks which hook resiliently on both ends of the holder in the final position of the pressing tool in which the feet of the holder are free of the undercuts of the grooves. Thereby, the holder is fixed on the removal device and upon the downward movement thereof is pulled out of the groove together with the corresponding strand of the winding.

5 Claims, 5 Drawing Sheets

DEVICE FOR REMOVING THE WINDING OF A LINEAR MOTOR

FIELD AND BACKGROUND OF THE INVENTION

The present invention relates to a device for removing the winding of a linear electric motor which is arranged in downwardly open grooves in a bundle of laminations which is fastened to a support, the individual strands of the winding being held fast in the grooves on mounts which extend over the entire length of the grooves and have, at least on both ends, on sides opposite each other, resilient feet having webs which in mounted position protrude from the grooves, the feet being engaged in mounted position in undercuts in the grooves.

Linear motors have been known for a long time for electric drives of the most different types. In this kind of motor, in contradistinction to the conventional motor, the stator and rotor are arranged not in a circle but in a straight line. The electrical energy is converted into mechanical energy in such a manner that it can be used directly for translation. Fields of use of linear motors are, for instance, movement of persons, conveyance and transportation, assembly lines, transport of packages, mining, cranes, towing installations and carriages of machine tools. Depending on the use, linear motors are accordingly of greater or lesser length. The winding is arranged in customary manner in the grooves in the bundle of laminations corresponding to the stator. The longer the stator is, the more laborious the work for the manufacturing and applying of the winding.

It is therefore known——for instance from Federal Republic of Germany Patent 29 20 478——to prefabricate the winding for a linear motor from three cables of meandering course. Each strand of the winding is fastened in this case to a trough-shaped holder. Resilient feet are arranged on the holder, the feet engaging in undercuts upon the pushing in of the holder into a groove in the bundle of laminations. The holder and the strand of winding arranged on it are then held fast in the groove. Such a prefabricated winding can, for instance, be mounted by means of a device known from Federal Republic of Germany Patent 33 23 696.

The spring feet of the holders are provided, in accordance with Federal Republic of Germany Patent 29 20 478, with webs which in mounted position extend so far out of the grooves of the bundle of laminations that they are accessible to a tool. By bending the webs, the feet of the holder can be bent out of the undercuts so that the holder can be removed from the groove together with the corresponding strand of the winding. This may be necessary, for instance, when repairs are to be carried out on the winding itself, on the bundle of laminations, on the holder, or on other parts of the linear motor.

SUMMARY OF THE INVENTION

It is an object of the invention so to develop a device of the above-described type that the winding of a linear motor can be removed easily from the grooves of the bundle of laminations, without danger of injury.

According to the invention, a vehicle (10) which is moveable on the support (11) has arranged on it at least one removal device (15) which has at least one pressing tool (18) with at least one pulling tool coupled to the latter, the device being arranged in working position directly below the bundle of laminations (1) and being moveable up and down perpendicular to the direction of movement of the vehicle (10);

the pressing tool (18) has two bevels extending in V-shape to each other which are intended to rest against all webs (6) of a holder (4), by which bevels, upon the upward movement of the removal device (15), two webs (16) present on opposite sides of the holder (4) are pressed towards each other; and the pulling tool consists of two hooks (22) which, in the end position of the pressing tool (18) in which the feet (5) of the holder (4) are free of the undercuts (9) of the grooves (2), engage with spring action on an axial end of the holder (4) so that the holder (4) is fixed on the removal device (15), and upon the downward movement of the latter, is pulled out of the groove (2) together with the corresponding strand (3) of the winding.

With this device, all feet of a holder are unlocked simultaneously upon the downward movement of the removal device, so that the holder can be removed from the groove. By means of suitably bent feet, the holder is fastened by the hooks to the removal device until holder and strand—due to the downward movement of the removal device—have been pulled out of the groove at least to such an extent that the feet can no longer engage in the undercuts. In this way, the winding is removed progressively from groove to groove out of the bundle of laminations as the vehicle moves further on the support. There is no danger here of damaging the winding, since the winding need not be touched at all. The removal device rather engages only on the holders, which in their turn continue to remain on the strands of the winding and thereby protect the latter. After the removal device has once been adjusted, the removal of the winding can take place automatically.

For this purpose there may be used a wheel which is coupled to the vehicle and is provided with a plurality of removal devices spaced apart from each other by a distance equal to the spacing of the grooves, the devices entering into action, one after the other, upon the rotation of the wheel.

According to a feature of the invention, several removal devices (15) are arranged, at a distance apart from each other corresponding to the distance between the grooves (2), between two rotatable wheels (25) which are coupled to the vehicle (10).

Still further according to the invention, in each removal device (15) two pressing tools (18), the distance apart of which corresponds to the distance between two grooves (10), as well as a pulling tool having two hooks (22) are arranged in each withdrawal device (15).

Yet according to a feature of the invention, projections (27) for the automatic unlocking of the hooks (22) are arranged on the wheels (25).

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
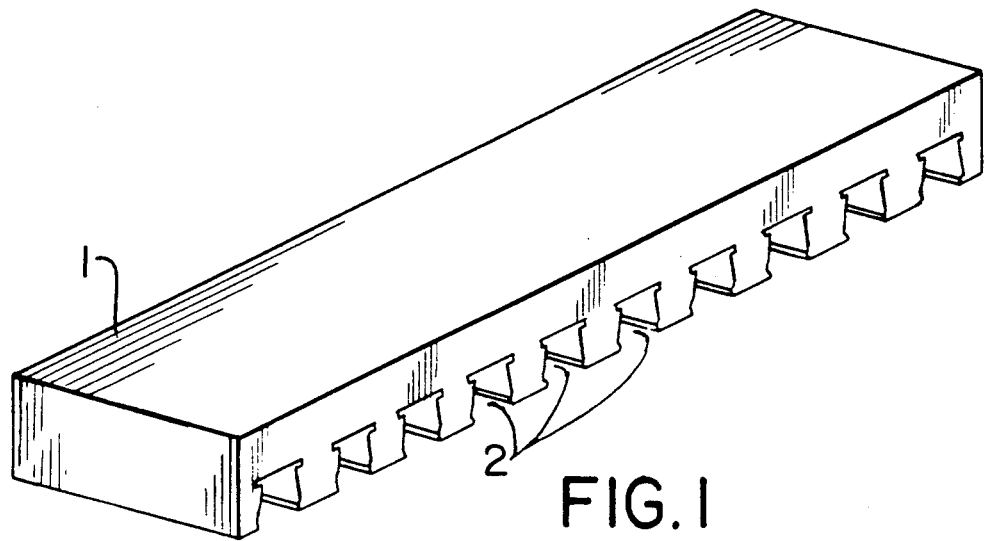
FIG. 1 in perspective view is a bundle of laminations for a linear motor.
Figure 2:
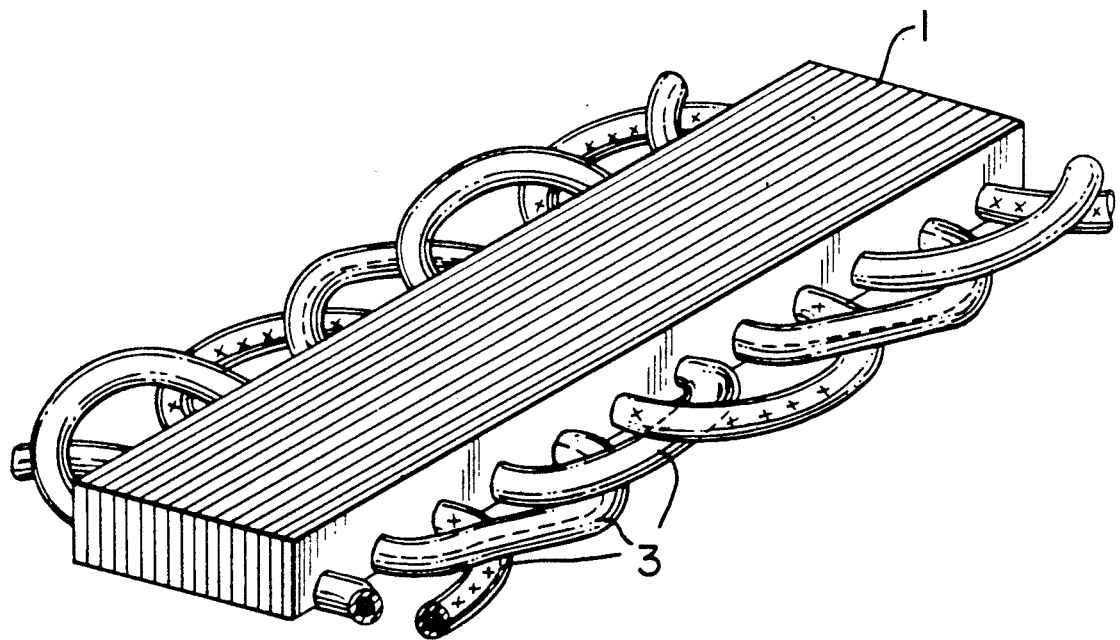
FIG. 2 shows a bundle of laminations supplemented by a three-phase winding.

FIG. 1 shows a portion of a bundle of laminations 1 for the stator of a linear motor which extends over the entire length of the linear motor. When the linear motor is used to drive a magnetic suspension railway, the stator may be far more than 100 km in length. The bundle of laminations 1 is then formed of a plurality of individual bundles. It is provided with grooves 2 which are arranged at a constant distance apart and extend over the entire width of the bundle of laminations 1. The bundle of laminations 1 is fastened by downwardly open grooves 2 to the lower side of a support 11 which can be seen in FIGS. 5 and 6. The grooves 2 serve to receive the winding of the linear motor, which winding, in accordance with FIG. 2, consists of three differently marked strands 3 which extend in meander form and are developed, for instance, as electric cable.

Figure 3:
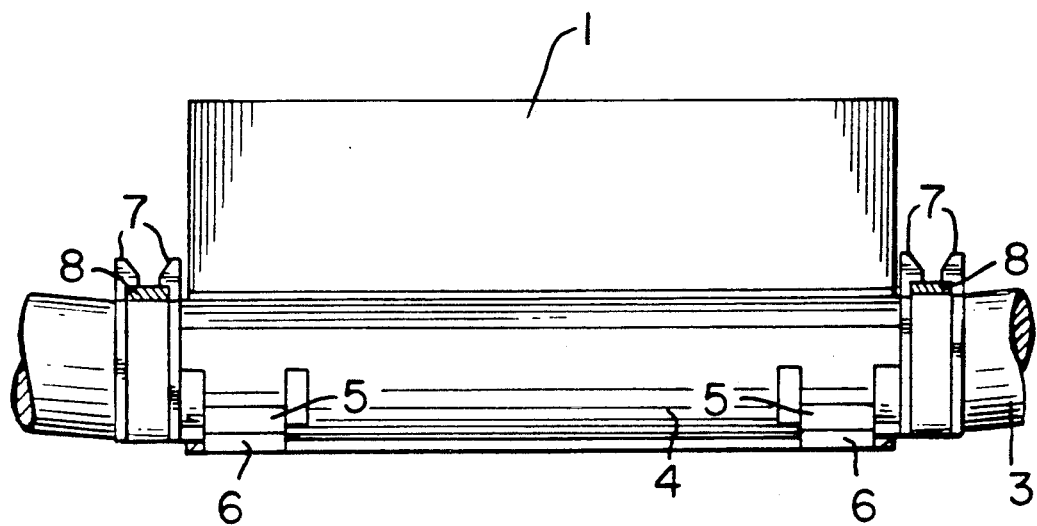
FIG. 3 is a cross sectional view through a bundle of laminations on a larger scale, the view being taken in the longitudinal direction of the bundle.
Figure 4:
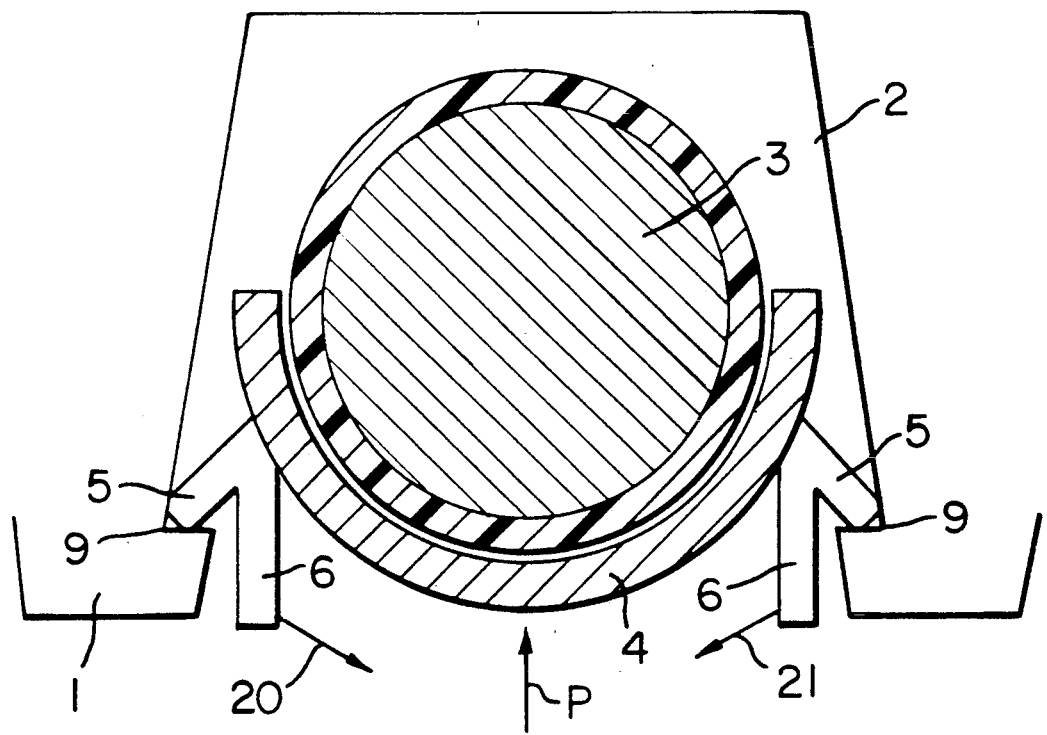
FIG. 4 is a cross section through a groove of the bundle of laminations of FIG. 3 again on a larger scale, the viewing direction being perpendicular of that of FIG. 3.

The strands 3 of the winding are fixed in the region intended for the grooves 2 in each case on trough-shaped holders 4 which at the same time serve for fastening the winding in the grooves 2 (FIGS. 3 and 4). The holders 4 consist of mechanically stable insulating material. At least on both axial ends, they have flexibly developed feet 5 on which there are arranged webs 6 which extend in mounted position out of the groove 2. The feet 5 with webs 6 are arranged, as shown in FIG. 4, in pairs on two opposite sides of the holders 4. On the end sides of the holders 4 there are furthermore provided clamping devices 7 to receive non-extendable bands 8 which serve to connect the individual holders 4.

When a strand 3 of the winding is introduced with its mount 4 into a groove 2, it is has a position such as shown in FIG. 4. Upon the pressing of the mount 4 into the groove 2 in the direction indicated by the arrow P, the feet 5 with the webs 6 are pressed together to such an extent that they can pass through the narrower groove opening. In the position shown in FIG. 4, the feet 5 have already sprung back outwards so that they place themselves in the undercuts 9 of the grooves 2 and in this way hold the holder 4 with strand 3 of the winding present on it firmly in the groove 2.

For easy pressing of the holders 4 into the grooves 2 and for reasons of symmetry, the feet 5 are in each case arranged in pairs on two opposite sides of the holders 4, as can be noted from FIG. 4. When the winding is to be remove from the bundle of laminations 1 for repair purposes, it is then sufficient for the webs 6 to be pressed so far inward that the feet 5 again pass through the groove openings. For such removal of the winding, devices such as can be noted for instance from FIGS. 7 to 10 can be used.

Figure 5:
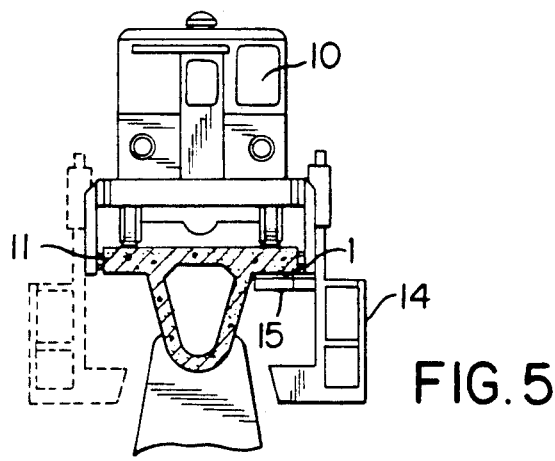
FIGS. 5 and 6 diagrammatically show a vehicle having a device in accordance with the invention, seen in end and side views, respectively.
Figure 6:
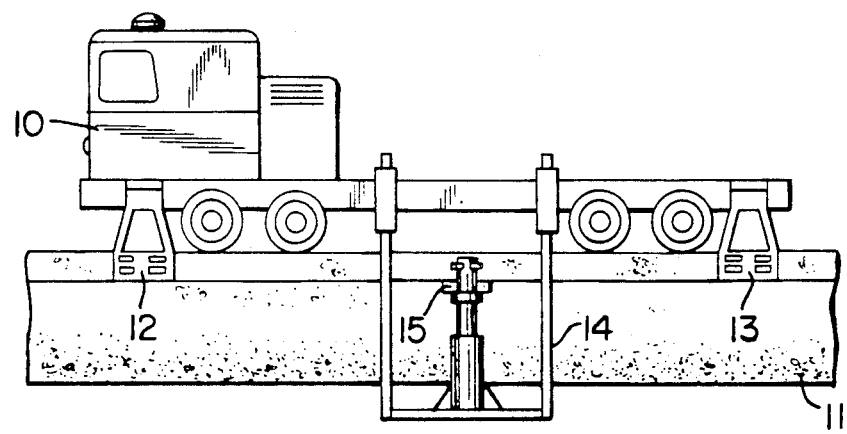
Figure 7:
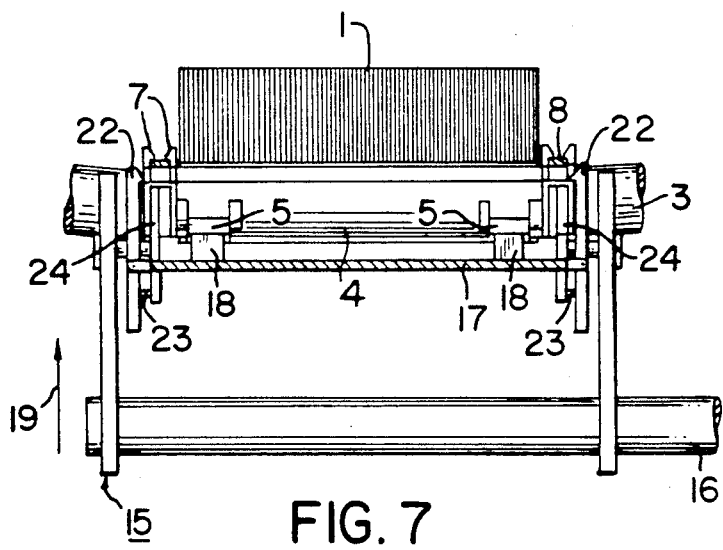
FIGS. 7 and 8 are two different views of a removal device which can be used for the device.

As shown in FIGS. 5 and 6, these devices can be fastened to a vehicle 10 which can be moved on a support 11 on which for instance a magnetic suspended vehicle subsequently travels. The vehicle is guided, for instance, at both ends by means of guide elements 12 and 13 at the two side edges of the support 11 so that it follows the course of the support 11 within narrow tolerances. On the vehicle 10 there is arranged at least one bracket 14 on which there is fastened a removal device 15 by means of which the winding can be removed from the grooves 2 of the bundle of laminations 1. The removal device 15 is arranged in working position directly below the bundle of laminations 1.

The removal device 15, which has been indicated only schematically in FIGS. 5 and 6, is shown in two different embodiments in FIGS. 7 to 10. The basic construction of the removal device 15 and its manner of operation will be described first of all with reference to FIGS. 7 and 8.

Figure 8:
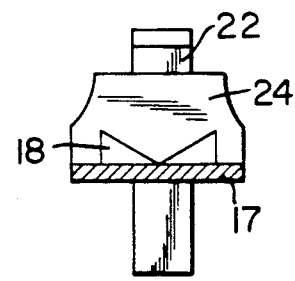

The removal device 15 which is attached by a pin 16 on a bracket 14 bears on a cross member 17 two pressing tools 18 which are directly opposite the webs 6 in the working position. Each of the pressing tools 18 consists, as shown in FIG. 8, of two bevels extending in V-shape to each other which are so dimensioned that they fit into the opening of a groove 2. Upon an upward movement of the removal device 15 in the direction indicated by the arrow 19, the bevels of the pressing tools 18 come against the webs 6 and press them inwards in the direction indicated by the arrows 20 and 21 (FIG. 4), so that in the final position the feet 5 are free of the undercuts 9 and pass through the openings of the grooves 2. In this final position, the two hooks 22 of the pulling tool of the removal device 15 which are held by springs 23 in the position shown in FIG. 8 snap over the holder 4 on the two axial ends thereof extending out of the bundle of laminations 1.

When the removal device 15 is then moved downward in direction opposite that of the arrow 19, it carries the holder 4 with the corresponding strand 3 along with it so that both come out of the groove 2. The removal device 15 can then be removed from the holder 4 by loosening the hooks 22 of the pulling tool. Since the pressing tools 18 must be introduced precisely into the grooves 2 of the bundle of laminations 1 so that the bevels can lie behind the webs 6, an exact guidance of the removal device 15 is necessary. For this guidance, there can be provided on the cross member 17 guide webs 24 which engage in corresponding recesses in the holder 4 or rest against them.

Figure 9:
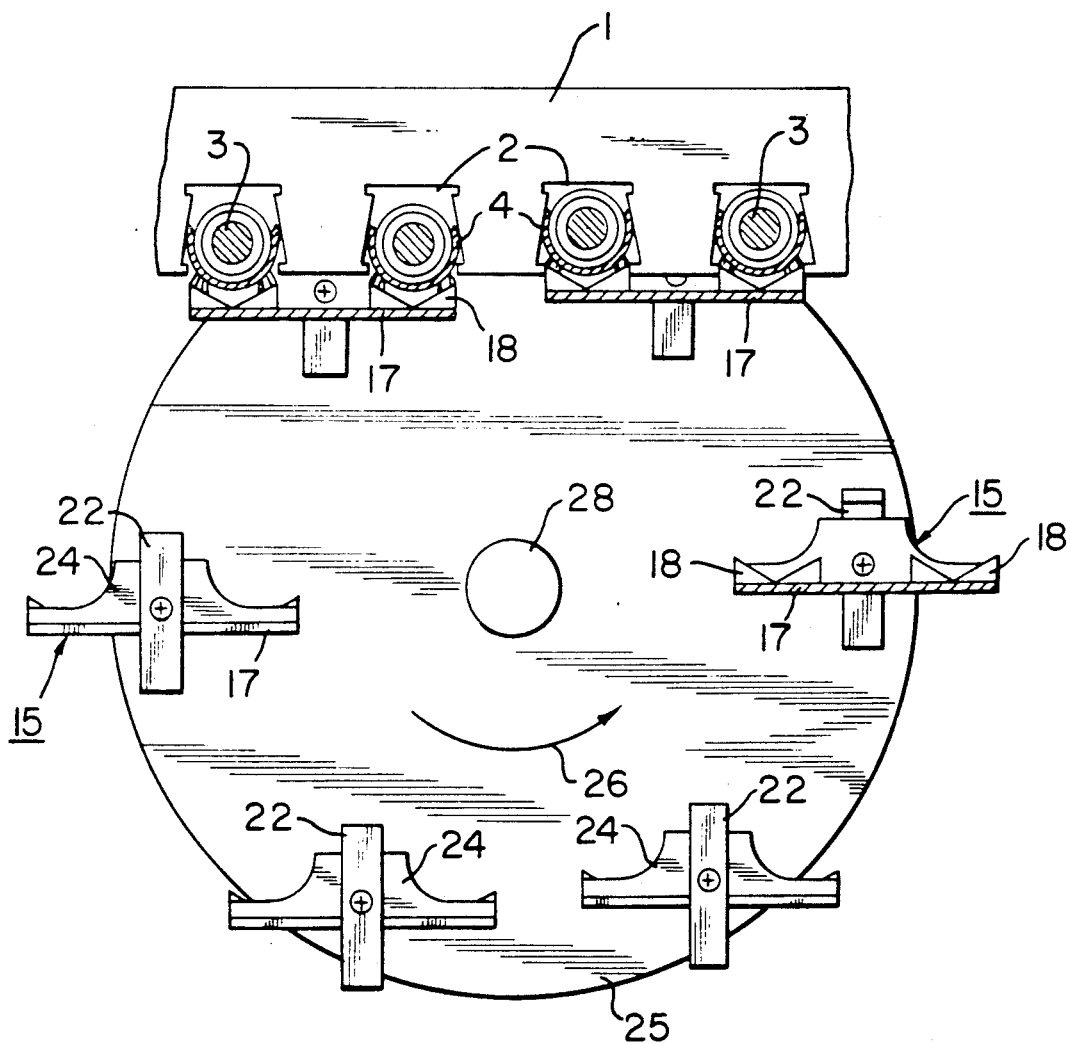
FIGS. 9 and 10 show a removal device which has been modified as compared with FIGS. 7 and 8, also in two different views.
Figure 10:
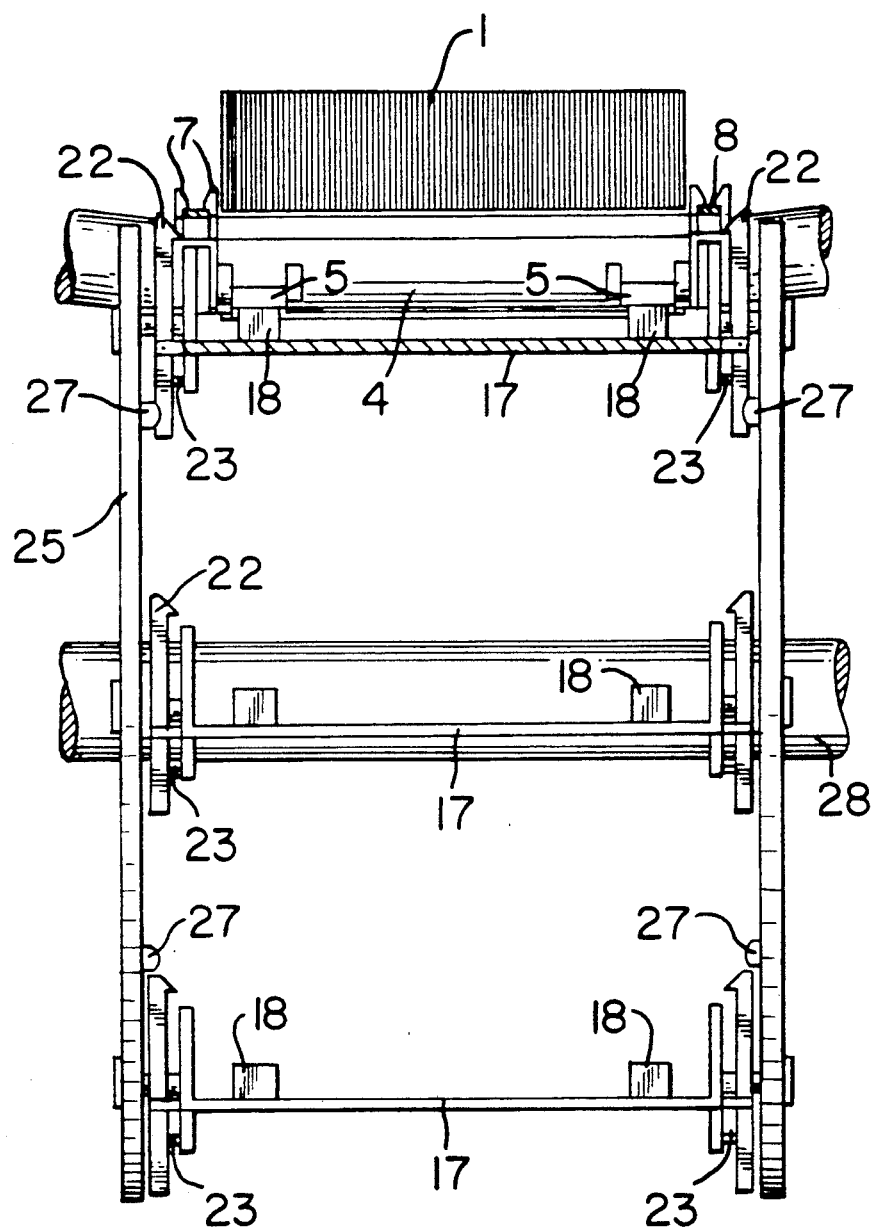

When the removal of the winding from the bundle of laminations 1 is to be effected automatically over a longer length, then, in a preferred embodiment, several removal devices 15 together with their cross members 17 are arranged between two wheels 25, as shown in FIGS. 9 and 10. FIG. 9 shows one of the wheels 25. The individual removal devices 15 are in this case arranged at a distance apart corresponding to the distance between the grooves 2. In this connection, each removal device 15 can advisedly be equipped with two pressing tools 18, the distance between which corresponds to the distance between two grooves 2. The holders 4 in two adjacent grooves 2 can then be loosened simultaneously by one removal device 15.

This takes place progressively by the rotation in the direction of the arrows 26 of the wheels 25 which are coupled with the vehicle 10. In the position shown to the top right in FIG. 9 a removal device 15 is shown in the final position in which the feet 5 of the holders 4 are bent to such an extent that they are unlocked from the undercuts 9 of the grooves 2. The loosened position in which the holders 4 with strands 3 already extend in part out of the grooves 2 is shown on the top left in FIG. 9. In this position, the hooks 23 of the pulling tool are automatically loosened from the holders 4 upon further rotation of the wheel 25. For this purpose, there are provided on the two wheels 25 projections 27 which move the hooks 22 outwardly, the springs 23 being thereby compressed. After passing the projections 27, the hooks 22 spring back into their position of rest, so that they are again ready to use for a removal.

The wheels 25, which are at a distance apart corresponding to the width of the bundle of laminations 1 or the length of the holders 4 are arranged on a shaft 28 which is fastened to the bracket 14 and is turned upon movement of the vehicle 10. As in the embodiment of FIG. 7, in each case two pressing tools 18 and two pulling tools are accordingly arranged on each cross member 17. The principle of the rotatable wheels 25 could also be employed if, with corresponding development of the holders 4, each of the removal devices arranged thereon had only one pressing tool 18 and only one pulling tool.

We claim:

1. A system for removing the winding of a linear electric motor having a bundle of laminations which is fastened to a support, the winding being arranged in downwardly open grooves in the bundle of laminations, wherein
   individual strands of the winding are held fast in the grooves by holders which extend over the entire length of the grooves;
   the holders have, at least on both ends, on sides opposite each other, resilient feet having webs which in mounted position protrude from the grooves;
   there are undercuts in the grooves, and the feet are engaged, in mounted position, in the undercuts in the grooves; the system comprising
   a vehicle which is moveable on said support; and
   at least one removal device located on said vehicle, said at least one removal device having at least one pressing tool and at least one pulling tool coupled to the pressing tool, said at least one removal device being located in working position directly below the bundle of laminations and being moveable up and down perpendicular to a horizontal direction of movement of the vehicle;
   wherein the pressing tool has two bevels extending in V-shape relative to each other to contact all the webs of said holder;
   upon an upward movement of the removal device, two of the webs present on opposite sides of the holder are pressed towards each other by the bevels;
   said pulling tool comprises two hooks;
   in an end position of the pressing tool, the feet of the holder are set free of the undercuts of the grooves by the pressing tool, and the two hooks of the pulling tool engage with spring action on an end of the holder to secure the holder to the removal device; and
   upon a downward movement of the removal device, the pulling tool pulls the holder out of the groove together with a corresponding strand of the winding.

2. A system according to claim 1, further comprising two rotatable wheels connected to said vehicle, and wherein several of said removal devices are arranged, at a distance apart from each other equal to a spacing between successive ones of said grooves, between the two rotatable wheels.

3. A system according to claim 2, wherein two of said pressing tools and two of said pulling tools are arranged in each of said withdrawal devices, and are spaced apart with a spacing equal to a spacing between two successive ones of said grooves.

4. A system according to claim 1, wherein two of said pressing tools and two of said pulling tools are arranged in each of said withdrawal devices, and are spaced apart with a spacing equal to a spacing between two successive ones of said grooves.

5. A system according to claim 2, further comprising projections disposed on said wheels to provide for an automatic unlocking of the hooks.

* * * * *